March 17, 1936.    D. W. FETHER    2,033,968
BRAKE AND FRICTION LINING
Filed June 17, 1935
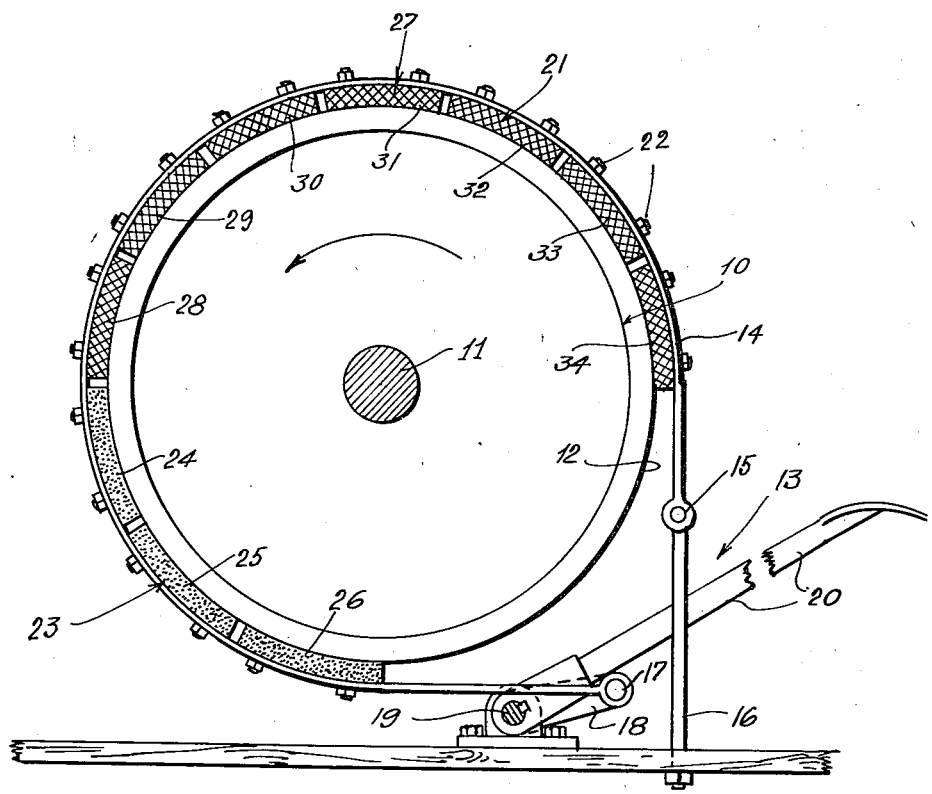
Inventor.
Donald W. Fether.
Attorney.

Patented Mar. 17, 1936

2,033,968

UNITED STATES PATENT OFFICE 2,033,968

BRAKE AND FRICTION LINING

Donald W. Fether, Downey, Calif., assignor to Emsco Asbestos Company, Downey, Calif., a corporation of California Application June 17, 1935, Serial No. 27,131

16 Claims. (Cl. 188—77)

This invention has to do generally with improvements in friction linings for brakes, clutches and the like, and has for its main object to prevent scoring in the metallic friction surfaces of such mechanisms; also to accomplish this purpose without sacrificing the maximum wearing life of the friction lining or the characteristics that are desired in the lining to give a smooth and evenly applied braking force. Throughout the following discussion the invention will be described in connection with brakes, with the understanding however that the invention is broadly applicable to clutches and other mechanisms containing friction linings and in which the hereinafter described scoring tendencies may occur.

In order that the invention and the reasons for its development may be properly understood, mention may be made preliminarily of certain observations that have been made in connection with conditions responsible for drum scoring, and the wearing and frictional qualities of certain types of friction linings. Experiments have indicated that using the same types or grade of friction lining, different brake drums have displayed varied scoring tendencies depending upon the carbon content of the steel. Contrary to expectations, it has been noted that a high quality drum, that is a drum made of high carbon steel, has materially greater scoring tendencies than a low carbon steel drum, except however as to the highest carbon steel drums in which the steel has such uniform surface hardness as not to present the later described relatively soft and hard areas giving rise to scoring. In fact, some of the low carbon or cast iron drums do not display any appreciable degree of scoring where proper friction lining is used. However, the disadvantage of using a low carbon steel drum, particularly for heavy duty work, is that it is subject to excessive wear.

In investigating the cause of scoring in higher carbon steel drums, microscopic observations of the steel have indicated the presence of relatively hard and soft areas, termed the pearlite and ferrite areas, respectively. The actual cause of scoring was discovered to result from the difference in the wearing qualities of the materials in these two areas and the effect resulting from the surface wear produced by the friction lining. As the relatively hard or pearlite areas wear away, a powder or dust of the hard material collects in small pockets within the ferrite areas which, because of the softness of the metal therein, wear to a greater extent than the hard areas.

The dust particles collecting in these pockets fuse together and increase in size to the point where they will no longer adhere to the steel or remain in the pockets, and then break loose, scoring or cutting grooves in the surface of the steel drum.

Having ascertained these conditions that exist in the surface of the drum itself, further observations have been made relative to the scoring effect resulting from the use of different types of friction linings. To cite an example: In a heavy duty brake applied to a hard or high carbon steel drum, it was observed that using an abrasive friction lining, such as a plastic or molded block type containing a substantial percentage of siliceous or other abrasive material, the drum would not score appreciably, but would wear away at least equally as fast as it would under scoring conditions. On the other hand, using a non-abrasive friction lining, for example of the woven type, the drum would become scored, but would not become worn nearly to the extent caused by the abrasive lining. It is believed that the reason why the abrasive or molded lining failed to display any appreciable scoring tendencies was that it kept the friction surface of the drum smooth by wearing away the ferrite and pearlite areas equally fast. Notwithstanding its ability to keep the drum surface smooth, the use of such abrasive lining, by itself is objectionable in that it results in excessive drum wear. It has, however, the further disadvantage of not being capable of affording a smoothness in applying the braking force or pressure, comparable with a non-abrasive or woven lining.

In addition to providing a method for eliminating scoring and avoiding excessive wear of both the drum and the friction lining, the invention has for its object to provide a lining which as a whole possesses the properties of abrasiveness sufficient to keep the drum in smooth and non-scoring condition, and pliability and smoothness necessary for the smooth and even application of the braking force. In accordance with the invention, the above mentioned objects are accomplished, for example as in the later described typical form, by incorporating in the friction lining of a brake mechanism, relatively abrasive and non-abrasive sections. The abrasive section preferably is relatively small in effective area and acts to evenly wear away the friction surface of the drum, but only to the extent required to keep it in smooth condition, while the non-abrasive section serves to provide the desired smoothness in action without any severe wearing tendencies. Satisfactory results have been obtained by forming the relatively abrasive portion of the lining of molded or block type material, and the non-abrasive section of a woven and characteristically wear resisting type lining. Preferably, in a band type brake of the form hereinafter described, the abrasive portion of the lining is applied to that portion of the band exerting the lowest pressure per unit area against the surface of the drum, so that while the pressure will be sufficient to produce the desired abrading of the drum, it will not be so high as to result in excessive wearing of the drum surface.

All the above mentioned objects and features of the invention, as well as further objects and details will be better understood from the description to follow. For purposes of description, reference is had to the accompanying drawing wherein I have shown a typical form of brake mechanism embodying the invention. It will be understood that this particular showing is to be regarded as typical only, and that the invention is equally applicable to other types of brake mechanisms, and in various modified forms which need not be specifically illustrated.

The drawing is a side elevational view showing a typical form of band type brake embodying the invention.

For purposes of illustration, I have shown a band type, heavy duty brake of the general form commonly used in conjunction with cable winding drums in well drilling equipment. The drum 10 rotates about its shaft 11 in the direction of the arrow, and has a cylindrical friction surface 12 to which the brake mechanism generally indicated at 13 is applied. The brake comprises a circularly extending band 14 anchored at 15 to the floor bolt 16, and connected at its other end 17 to an arm 18 fixed to shaft 19. The band 14 is tensioned about the drum 10 by operating a lever 20 keyed to shaft 19, downward movement of the lever acting to swing arm 18 so as to tension the band, and reverse movement of the lever to release the band tension.

The brake band 14 carries a friction lining generally indicated at 21, consisting of a series of arcuate sections fixed to the band by bolts 22, or any other suitable means. The lining 21 comprises a portion 23, including blocks or sections 24, 25 and 26, of relatively abrasive material, and a substantially longer and relatively greater effective surface area portion 27, including sections 28 to 34, inclusive, of relatively non-abrasive friction lining. It will be understood that the relative lengths, in the direction of drum rotation, and effective surface areas of the abrasive and non-abrasive portions 23 and 27 of the lining, may be varied within substantial limits in accordance with the type of brake or properties of the drum steel, and various other considerations that may be involved in particular mechanisms. In general, however, the abrasive portion of the lining will have a considerably smaller area friction surface in contact with the drum, since this area need only be large enough to afford sufficient abrading action to maintain the friction surface 12 of the drum in smooth condition. The greater portion of the braking pressure is applied by the relatively soft and non-abrasive portion 27 of the lining, with the result that the effect of the lining as a whole is to give a smooth braking action.

Blocks 24, 25 and 26 of portion 23 of the lining may be made of any suitable material capable of having the desired abrasive action on the drum. Preferably these sections will be made of what is commonly termed an abrasive molded or block type lining. Sections 28 to 34 in portion 27 of the lining may also be selected from any suitable substantially non-abrasive materials, although for this portion of the lining I prefer to use a woven asbestos yarn material because of its smooth-acting and wear-resisting qualities.

It will be understood that portions 23 and 27 of the lining differ in their effect upon the surface of the drum, beyond mere differences in their braking actions per unit area due to the difference in their coefficient of friction. The material of section 23 has a direct abrading action on the drum surface so as to keep it in uniformly smooth condition, and thereby keep the metal surface in proper condition for the most effective application of the non-abrasive material 27.

Preferably the abrasive and non-abrasive portions of the lining are arranged within the band 14 in the manner illustrated so that when the brake is applied, the greater pressures applied to the drum will be exerted by the non-abrasive sections. When the brake is applied, the pressure exerted by the band 14 is not uniform throughout its extent. For example, in a typical heavy duty brake, the pressure exerted by section 26 will average 14 lbs. per sq. in., and this unit pressure will increase in a direction counter to the direction of rotation of the drum. Thus the average unit pressures exerted by sections 25 and 24 will be in the neighborhood of 17 and 23 lbs. per sq. in., respectively. Then in the non-abrasive portion 27 of the lining, the average unit pressure will increase from around 29 lbs. in section 28, to 108 lbs. in section 34. Thus it will be seen that the greater wearing pressures are largely confined to the woven and wear resisting sections of the lining in the non-abrasive portion 27. As a result I avoid excessive drum wear that might result from applying the abrasive portion under correspondingly high pressure, or pressures greater than that required to merely maintain the surface of the drum in smooth condition.

I claim:

1. In a brake or the like, a metallic member having a friction surface, means applied to said surface and acting to abrade and maintain said surface in uniformly smooth condition, and a relatively non-abrasive friction element having a non-metallic body applied to said surface.

2. In a brake or the like, a member having a metallic friction surface, means having a relatively small friction surface area applied to said metallic surface and acting to abrade and maintain said metallic surface in uniformly smooth condition, and a relatively non-abrasive friction means having a non-metallic body and a relatively large friction surface area applied to said metallic surface.

3. In a brake or the like, a member having a metallic friction surface, means applied to said surface and acting to abrade and maintain said surface in uniformly smooth condition, a relatively non-abrasive friction element having a non-metallic body applied to said surface, said means and friction element being arranged so as to maintain a greater pressure per unit area of the friction element against said metallic surface than the pressure of the first mentioned means thereagainst.

4. In a brake or the like, a member having a metallic friction surface, means having a relatively small friction surface area applied to said metallic surface and acting to abrade and maintain said metallic surface in uniformly smooth condition, a relatively non-abrasive friction element having a non-metallic body and a relatively large friction surface area applied to said metallic surface, said means and friction element being arranged so as to maintain a greater pressure per unit area of said non-abrasive friction means against said metallic surface than the pressure of the first mentioned means thereagainst.

5. In a brake or the like, a rotating drum, a circular band around said drum, and a friction lining within said band comprising arcuate sections of relatively abrasive and non-abrasive asbestos containing materials, said abrasive material acting to abrade and maintain the surface of said drum in uniformly smooth condition.

6. In a brake or the like, a rotating drum, a circular band around said drum, and a friction lining within said band comprising an arcuate section of abrasive lining and a substantially longer section of relatively non-abrasive lining, said abrasive lining acting to abrade and maintain the surface of said drum in uniformly smooth condition.

7. In a brake or the like, a rotating drum, a circular band around said drum, and a friction lining within said band comprising an arcuate section of abrasive molded lining and a section of relatively non-abrasive lining, said abrasive lining acting to abrade and maintain the surface of said drum in uniformly smooth condition.

8. In a brake or the like, a rotating drum, a circular band around said drum, and a friction lining within said band comprising an arcuate section of abrasive molded lining and a section of relatively non-abrasive woven lining, said abrasive lining acting to abrade and maintain the surface of said drum in uniformly smooth condition.

9. In a brake or the like, a rotating drum, a circular band around said drum, and a friction lining within said band comprising an arcuate section of abrasive molded lining and a substantially longer section of relatively non-abrasive woven lining, said abrasive lining acting to abrade and maintain the surface of said drum in uniformly smooth condition.

10. In a brake or the like, a rotating drum, a circular band around said drum, a friction lining within said band comprising arcuate sections of relatively abrasive and non-abrasive materials, said sections being arranged so that when pressed against the drum, the pressure per unit area of said abrasive section against the drum surface is substantially less than the pressure of the relatively non-abrasive section thereagainst, and said abrasive section acting to abrade and maintain the drum surface to which it is applied in uniformly smooth condition.

11. In a brake or the like, a rotating drum, a circular band around said drum, a friction lining within said band comprising an arcuate section of abrasive lining and a substantially longer section of relatively non-abrasive lining, said sections being arranged so that when pressed against the drum, the pressure per unit area of said abrasive section against the drum surface is substantially less than the pressure of the relatively non-abrasive section thereagainst, and said abrasive section acting to abrade and maintain the drum surface to which it is applied in uniformly smooth condition.

12. In a brake or the like, a rotating drum, a circular band around said drum, a friction lining within said band comprising arcuate sections of relatively abrasive and non-abrasive materials, said sections being arranged so that a substantially greater total pressure of said relatively non-abrasive sections is maintained against the drum than the total pressure of said abrasive section thereagainst, and said abrasive section acting to abrade and maintain the drum surface to which it is applied in uniformly smooth condition.

13. A friction lining for application to a metallic surface in a brake or the like, comprising a section of abrasive material adapted to abrade and maintain the metallic surface to which it is applied in uniformly smooth condition, and a substantially non-abrasive section having a non-metallic body.

14. A friction lining for application to a metallic surface in a brake or the like, comprising a section of abrasive material adapted to abrade and maintain the metallic surface to which it is applied in uniformly smooth condition, and a substantially non-abrasive section having a non-metallic body, both of said sections being formed of asbestos containing materials.

15. A friction lining for application to a metallic surface in a brake or the like, comprising a section of abrasive molded material adapted to abrade and maintain the metallic surface to which it is applied in uniformly smooth condition, and a relatively non-abrasive section of woven material.

16. A friction lining for application to a metallic surface in a brake or the like, comprising a section of abrasive material adapted to abrade and maintain the metallic surface to which it is applied in uniformly smooth condition, and a substantially non-abrasive section having a non-metallic body, the last mentioned section having substantially greater effective surface area than said section of abrasive material.

DONALD W. FETHER.